United States Patent
Knobel et al.

(10) Patent No.: US 8,264,696 B2
(45) Date of Patent: Sep. 11, 2012

(54) MEASURING INSTRUMENT AND METHOD FOR DETERMINING GEOMETRIC PROPERTIES OF PROFILE SECTIONS

(75) Inventors: Bruno Knobel, Laufen (CH); Charles Findeisen, Wettingen (CH); Klaus Leistritz, Bad Zurzach (CH)

(73) Assignee: TeZet Technik AG, Bad Zurzach (CH)

( * ) Notice: Subject to any disclaimer, the term of this patent is extended or adjusted under 35 U.S.C. 154(b) by 64 days.

(21) Appl. No.: 12/526,410

(22) PCT Filed: Feb. 11, 2008

(86) PCT No.: PCT/EP2008/001007
§ 371 (c)(1),
(2), (4) Date: Feb. 22, 2010

(87) PCT Pub. No.: WO2008/095733
PCT Pub. Date: Aug. 14, 2008

(65) Prior Publication Data
US 2010/0141961 A1 Jun. 10, 2010

(30) Foreign Application Priority Data

Feb. 9, 2007 (DE) .......................... 10 2007 007 153
Jul. 19, 2007 (DE) .......................... 10 2007 033 966

(51) Int. Cl.
*G01B 11/30* (2006.01)
*G01B 11/24* (2006.01)
(52) U.S. Cl. ........................................ 356/612; 356/613
(58) Field of Classification Search .......... 356/600–640
See application file for complete search history.

(56) References Cited

U.S. PATENT DOCUMENTS

| | | | | |
|---|---|---|---|---|
| 4,507,557 A | * | 3/1985 | Tsikos | 250/341.7 |
| 4,819,660 A | * | 4/1989 | Smith | 600/587 |
| 4,848,912 A | | 7/1989 | Sano et al. | |
| 5,335,288 A | * | 8/1994 | Faulkner | 382/115 |
| 5,483,601 A | * | 1/1996 | Faulkner | 382/115 |
| 2007/0297665 A1 | * | 12/2007 | Segev | 382/141 |

FOREIGN PATENT DOCUMENTS

| | | |
|---|---|---|
| EP | 0 121 840 A | 10/1984 |
| EP | 0 554 920 A | 8/1993 |
| FR | 2 611 263 A | 8/1988 |
| WO | WO 2006/048857 A | 5/2006 |

* cited by examiner

*Primary Examiner* — Michael P Stafira
(74) *Attorney, Agent, or Firm* — Henry M. Feiereisen, LLC

(57) ABSTRACT

Disclosed is a measuring instrument for determining geometric properties of a profiled element. Said measuring instrument comprises:—a device that generates at least one first light beam (7) and a second light beam (8), the direction of radiation of the first light beam being different from the direction of radiation of the second light beam;—a retro-reflecting surface (3) which is arranged in such a way relative to the light source that at least some of both light beams is incident on the retro-reflecting surface; and—a recording device (14) which can determine, across the transversal extension thereof, the light intensity distribution of at least some of the reflected light beam of the first light beam and at least some of the reflected light beam of the second light beam, the first light beam being reflected by the retro-reflecting surface and the second light beam being reflected by the/a retro-reflecting surface.

18 Claims, 6 Drawing Sheets

MEASURING INSTRUMENT AND METHOD FOR DETERMINING GEOMETRIC PROPERTIES OF PROFILE SECTIONS

CROSS-REFERENCES TO RELATED APPLICATIONS

This application is the U.S. National Stage of International Application No. PCT/EP2008/001007, filed Feb. 11, 2008, which designated the United States and has been published as International Publication No. WO 2008/095733 and which claims the priorities of German Patent Applications, Serial No. 10 2007 007 153.3, filed Feb. 9, 2007, and Serial No. 10 2007 033 966.8, filed Jul. 19, 2007, pursuant to 35 U.S.C. 119(a)-(d).

BACKGROUND OF THE INVENTION

The invention is directed to a measuring instrument and a method for determining geometric properties of profile sections.

Measuring the three-dimensional arrangement of objects, for example of tubes and rods with different cross sections, is a frequently recurring problem in industrial measurement techniques. A frequent task is to measure tubes installed in automobiles, aircrafts, ships, submarines, laboratories, assembly lines and the like, and to determine their position in relation to a fixed coordinate system. Another frequently occurring task is adapting tubes to existing fittings. To accomplish this, an exact initial measurement of the position of these fittings and possible obstacles or passageways is required.

Different methods for measuring tubes are known in practice. A frequently used measuring instrument has a measuring fork with two intersecting light beams. The fork resides here on a measuring arm. Because the measuring arm has a defined origin in the coordinate system and because the position of the end of the measuring arm to which the fork is attached can also be determined, the spatial coordinates of the fork can be exactly determined. By suitable movement of the fork towards and away from the measure object, the spatial position of the tube and its diameter at the respective measurement location can be determined with suitable measurement software. The spatial positions of the tube fittings or obstacles can be measured additionally by mechanical scanning with an applied sensor tip. Positioning of the measuring fork relative to the measured object during the measurement process can be substantially supported with an oriented light beam.

With smaller tubes, it is also known to employ measurement banks with several video cameras. The geometry of the tubes can be determined from the images recorded with the video cameras by using 3-D software.

It is also known to measure tubes with surface scanners using suitable software. This measurement principle, however, is not suitable for shiny or strongly absorbing objects. This can be remedied by applying a dye or powder to the surface which, however, is rather time consuming.

U.S. Pat. No. 4,848,912 discloses use of two perpendicular light curtains with parallel light.

SUMMARY OF THE INVENTION

In view of the foregoing examples, it is an object of the invention to propose a measuring instrument and a method for determining a geometric property of an object which obviates at least one of the disadvantages of the state-of-the-art.

According to one aspect of the invention, the object is attained with the measuring instrument for determining at least one geometric property of a profile section includes an assembly which produces at least one first and one second light beam, wherein the beam direction of the first light beam is different from the beam direction of the second light beam, a retro-reflecting surface, which is arranged with respect to the light source so that at least the first light beam is incident at least partially on the retro-reflecting surface, a recording device which is capable of determining the light intensity distribution of at least a portion of the light beam reflected by the retro-reflecting surface and at least a portion of the second light beam by way of their transverse dimension, or a recording device which is capable of determining the light intensity distribution of at least a portion of the first light beam reflected by the retro-reflecting surface and at least a portion of the second light beam reflected by the/a retro-reflecting surface by way of their transverse dimension.

The invention is based on the concept that the silhouette of the object that is produced when the object is illuminated with a light beam can be used for measuring the geometric property. The invention is based on the realization that such measuring instrument can have a particularly simple construction when using a retro-reflecting surface which is arranged relative to the light source so that the light beam is at least partially incident on the retro-reflecting surface. According to a preferred embodiment, with such measuring instrument the recording device which can determine the light intensity distribution of at least a portion of the light beam reflected by the retro-reflecting surface across its transverse dimension, can then be arranged in the region of the light source which produces the light beam. In this way, for example, electrical connections for the light source and the recording device can be provided on one and the same side of the measuring instrument. However, it is not necessary within the context of this invention that the recording device is arranged directly in the region of the light source. This is only a particularly preferred embodiment.

The invention is also based on the concept that the measurement of a geometric property of an object provides particularly good measurement results when as part of the measurement device an assembly is provided which generates at least two light beams with different beam directions. Employing two light sources can, depending on the design and arrangement of the recording devices, result in a light intensity distribution that produces a light intensity pattern in two separate areas, which can then be used for determining the diameter of the object to be measured as well as for determining the center of the cross-section of the object to be measured.

Determining the geometric property of an object refers in particular to
- the determination of the diameter of an object in a measurement plane,
- the determination of the change of the diameter of the object in parallel measurement planes,
- the determination of the longitudinal dimension of the object or of a part of the object (for example a protrusion or an edge) in one or several directions of a coordinate system,
- the determination of the center of a cross-section of an object in a cross-sectional plane,
- the determination of the course of the center point over several cross-sections arranged in parallel planes.

The use of the singular form in the description or in the claims does not indicate a limitation, and the term "a" is an undetermined article and is not to be understood as representing a numerical quantity.

Transverse dimension of a light beam refers to a dimension which is not in the same direction as the beam. Particularly preferred, transverse dimension refers to the dimension perpendicular to the beam direction. However, depending on the angle of incidence of the light beam on the recording device, the transverse dimension can also enclose an angle smaller or greater than 90° relative to the beam direction, with the light intensity distribution measured in this direction.

The measuring instrument according to the invention for determining a geometric property of an object includes an assembly which produces at least one first and one second light beam, wherein the beam direction of the first light beam is different from the beam direction of the second light beam. The measuring instrument according to the invention also includes a retro-reflecting surface, which is arranged with respect to the light source (10) so that at least the first light beam is incident at least partially on the retro-reflecting surface. Moreover, there is provided either a recording device which is capable of determining the light intensity distribution of at least a portion of the light beam reflected by the retro-reflecting surface and at least a portion of the second light beam by way of its transverse dimension, or a recording device which is capable of determining the light intensity distribution of at least a portion of the first light beam reflected by the retro-reflecting surface and at least a portion of the second light beam reflected by the/a retro-reflecting surface by way of its transverse dimension.

The recording device can for example have two parts, for example two spaced-apart line cameras, which also can be arranged opposite to one another and face each other. In a particularly preferred arrangement, a single-part recording device can be employed, which is capable of measuring, for example, both light intensity distributions across the dimension of a single line camera.

Employing a retro-reflecting surface has the particular advantage that the partial beams of the light beam, after propagating past the object, are reflected essentially in exactly opposite directions, so that they can be recorded in the region of the light source by the recording device. Due to the reversal of the beam direction by essentially 180°, the information about the silhouette of the object remains substantially unchanged. Accordingly, a precise measurement can be performed.

In a particularly preferred embodiment, a retro-reflecting surface is attained by providing the surface with a plurality of triple mirrors or spherical scattering elements. However, other embodiments for producing a retro-reflecting surface can also be contemplated.

Because the measurement of a geometric property also includes the measurement of the position of an edge of the object, the advantages of the invention can also be attained in measurement situations where the light beam is not completely incident on the retro-reflecting surface, as long—in this particular embodiment of the invention—the retro-reflecting surface reflects the partial beams required for determining the position of a part of the silhouette, for example of an edge.

In a particular preferred embodiment, the light beam is implemented as a so-called light curtain. The term light curtain refers in particular to a light beam which extends essentially only in a plane and which is composed of mutually parallel partial light beams.

According to a preferred embodiment, the angle between the beam directions is different from 90° as well as from a multiple of 90°.

Figure 1:
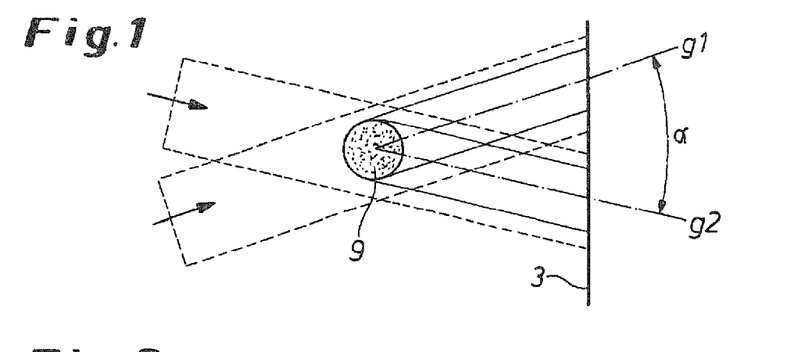

The measurement principle on which the invention is based will be described with reference to FIG. 1 based on an exemplary measurement on a tube 9. Two light curtains with parallel partial light beams propagating along the straight lines g1 and g2 intersect in the measurement region. The enclosed angle a is, for example, 30°.

A portion of the light beams is hereby blocked by the measured object. The light beams that are not blocked propagate past the measured object and reach the reflecting side of a retro-reflecting medium 3 (in this exemplary embodiment both light beams are incident on retro-reflecting surfaces). The light beams are then retro-reflected in the direction of incidence. The retro-reflected light beams are then incident on a recording device with line sensors. The center and the diameter of the tube cross-section are determined from the signal distributions along the line sensors. Advantageously, a common line sensor is used for both light curtains. A typical signal curve of a common line sensor is illustrated in FIG. 2.

Figure 2:
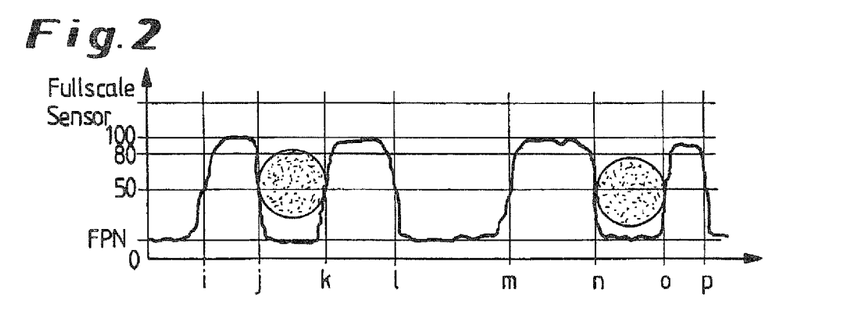
FIG. 2 a signal trace, as recorded by a recording device of the measuring instrument of FIG. 1, which can determine the light intensity of at least a portion of the light beam across its transverse dimension.

The signal trace of the two light curtains on the common sensor is schematically illustrated in FIG. 2 between [i to l] and [m to p]. The diameter of the measured object (indicated as a circle) is in the corresponding direction of the light curtain the distance [k to j] and [o to n], respectively. The center of the tube cross-section is defined by the intersection between the two straight lines g1 and g2, which extend through the bisecting lines (k to j)/2 and (o to n)/2. The four signal transitions at j, k, n and o correspond to the partial light beams which are tangential on the measured object. The spatial position of the device itself is measured, for example, with the measuring arm or a tracking system, which can be used to determine the location of the center in three-dimensional space. The three-dimensional position of the tube centerline and additional information about the cross-section, such as the diameter, can be determined by moving the device along the tube.

In a particularly preferred embodiment, the assembly which produces at least two light beams with different beam directions generates a first light curtain representing a first light beam and a second light curtain representing the second light beam. It has been observed that a particularly good measurement results can be attained by using two light curtains.

The angle between the beam directions can be selected depending on the measurement environment. In a preferred embodiment, the angle between the beam direction of the first light beam and the beam direction of the second light beam is between 15° and 45°, particularly preferred is 30°. It has been shown that particularly good measurement results can be obtained by arranging the light beams in this way.

In a preferred embodiment, the assembly, which produces at least two light beams with different beam direction, is constructed to have at least two light sources.

In a preferred embodiment, the assembly is constructed with a light source producing a divergent light beam and a concave mirror on which the divergent light beam is incident in such a way that the light beam reflected by the concave mirror is a light beam with parallel light.

In a preferred embodiment, the first and the second light beams are produced by two light sources producing two light beams with divergent light beams, which are directed by a common deviating mirror or by two separate deviating mirrors onto a common concave mirror, so that the light beams reflected by the concave mirror form the first light beam and the second light beam. Although the particularly preferred light curtains can be produced in other ways, it has been shown that this configuration enables a particularly compact construction of the measuring instrument of the invention.

The measuring instrument does not require a retro-reflecting surface which is fixedly connected with a base body of the measuring instrument. The retro-reflecting surface of the measuring instrument of the invention is frequently formed by using the surface of a measurement table, on which the object to be measured is located, as a retro-reflecting surface. However, the retro-reflecting surface can also be formed by a wall located behind an object to be measured and disposed in free space. In a particularly preferred embodiment, the measuring instrument has a retro-reflecting surface which is formed on a reflecting element. This reflecting element can, for example, in conjunction with a base body of the measuring instrument, form a C-shaped body or fork-shaped body that surrounds the object to be measured. If the object to be measured is surrounded in this way, then the light source is arranged directly on one side of the object to be measured and the retro-reflecting surface on the other side.

In a particular preferred embodiment, the retro-reflecting surface may be formed on a reflector part that is releasably connected with a base body, wherein the base body includes the light source or the assembly that produces the first and the second light beam having different beam directions. This embodiment broadens the applications for the measuring instrument of the invention. For example, a measuring instrument configured in this manner can be used to surround the object to be measured with a C-shape or fork-shape. On the other hand, the measuring instrument can also be used, after the reflecting element has been removed, to measure an object located on a measurement table wherein the surface of the measurement table is made retro-reflecting.

In a particularly preferred embodiment, a base body is provided which has a recording device capable of determining the light intensity of at least a portion of the light curtain reflected by the retro-reflecting surface, or of the light beam across its transverse dimension. In this way, the recording device as well as the light source, or the assembly for producing two light beams with different beam directions, can be arranged in a single base body, which makes the measuring instrument particularly easy to handle.

In a particular preferred embodiment, the measuring instrument has a beam splitter which directs the reflected light curtain, or the light beam, to be recorded on the recording device. A beam splitter can be arranged, for example, between a concave mirror and a light source with divergent light. In one of the beam directions, the light from the light source passes through the beam splitter and is transformed by the concave mirror into a light curtain. In the other beam direction, the reflected light beam is focused by the concave mirror and directed by the beam splitter onto a recording device. The recording device can then be made smaller, because the reflected light is partially focused by the concave mirror.

In a preferred embodiment, the measuring instrument has a measuring arm. By using a measuring arm, the position of the measuring instrument can be transformed into a known coordinate system. For example, the fixed end of the movable measuring arm can be used as the origin of the coordinate system. If the measuring arm is configured so as to be aware of the position of its end that is located opposite the pivot point on which the measuring instrument is arranged, then the measurement results of the measuring instrument can be converted into the coordinate system of the measuring arm. In a preferred embodiment, the measuring arm is connected with the assembly that generates the two light beams, and more particularly with a base body of the measuring instrument.

The instrument can be equipped with a processor. The measured values are evaluated directly in the instrument (for example, in FIG. 3 in the sensor head (based body)) and are transmitted via standard communication means (USB, Ethernet, FireWire) in real time to a host (for example a PC or a laptop).

Optionally, the data can be completely or partially processed on the host. The instrument can be synchronously coupled to the measuring arm or the tracking system. In this way, the measurement from the position measurement of the sensor head (from the measuring arm or from the tracking system) and the measurements from the sensor head can be related and subsequently synchronously analyzed.

The instrument can also be equipped with a switch for triggering the measurement process. Information displays, such as "measured object is in the measurement region" or "measured object is not in the measurement region", can be integrated into the instrument. This significantly enhances the measurement process.

The measured object can be measured very conveniently with the device of the invention: Because it is now possible to continuously acquire the diameter and position without additional lateral movement, the sensor head can be moved ergonomically and quickly in the longitudinal direction across the measured object. Moreover, the measured object no longer requires a surface treatment: very shiny parts can hence be precisely measured as well as black or semitransparent materials.

In a particularly preferred embodiment, the measuring instrument is equipped with a touch sensor which can be used to trace a surface or a point of the object to be measured.

According to another aspect of the invention, the object is attained with the method for determining a geometric property of an object includes, in particular, the following steps:
  a first and a second light beam having different beam directions are produced by an assembly,
  the object to be measured is held between the assembly and a retro-reflecting surface in such a way that the first light beam is incident partially on the retro-reflecting surface and partially on the object to be measured, and
  a recording device measures the light intensity distribution across a transverse dimension at a first location located in the beam path of at least a portion of the light beam reflected by the retro-reflecting surface, and measures the light intensity distribution across a transverse dimension at a second location located in the beam path of at least a portion of the second light beam, or
  a recording device measures the light intensity distribution across a transverse dimension at a first location located in the beam path of at least a portion of the light beam reflected by the retro-reflecting surface, and measures the light intensity distribution across a transverse dimension at a second location located in the beam path of at least a portion of the second light beam that is reflected by the/a retro-reflecting surface, and
  determines from the light intensity distribution the geometric property of the object.

Depending on the application, when determining the position of a portion of the silhouette of the object to be measured, it may be sufficient for performing the method of the invention, if the object to be measured is at least partially located in the light beam. However, in a particularly preferred embodiment, the object to be measured is held in the light beam such that the partial light beams of the light beam propagate past the object on opposing sides of the object.

Figure 9A:
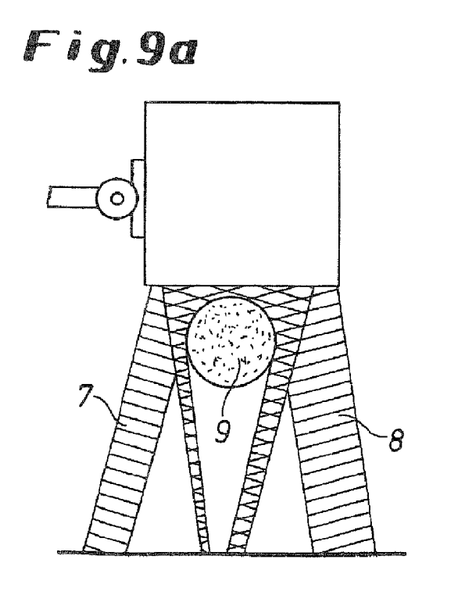
FIGS. 9a, 9b, 9c, 9d other exemplary measurement situations.
Figure 9B:
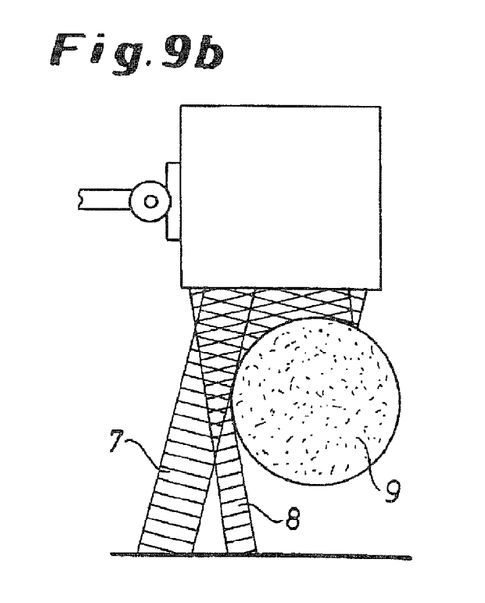
Figure 9C:
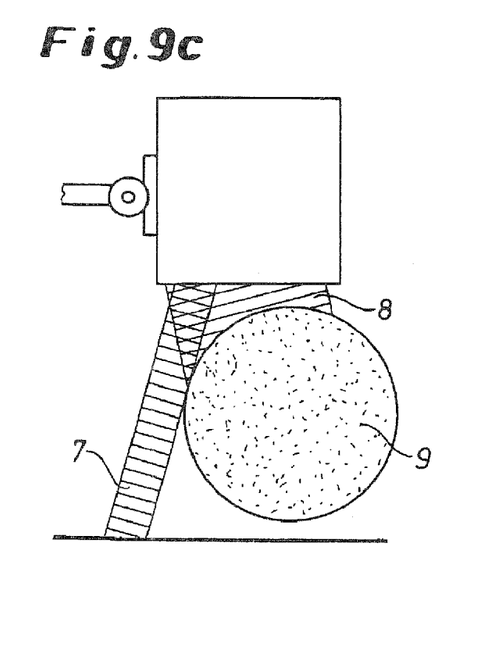

The method of the invention, in particular in a preferred embodiment where the measuring instrument is mounted on a measuring arm, can be used to measure objects which have such a large cross-section that only one light beam partially propagates past the object, whereas the other light beam is completely incident on the object (see FIG. 9c). Measuring the light intensity distribution across a transverse dimension and a location which is located in the beam path of a portion of a light beam refers therefore also to the measurement of the light intensity distribution at a location located in the beam path of a light beam, wherein the light beam propagates in the same manner as if the object were not located in the light beam. In the particular situation illustrated in FIG. 9c, the measurement of the light intensity distribution for this not fully obscured light beam also provides information that the measured object has such a large cross-section that only that one light beam partially propagates past the object.

In a particularly preferred embodiment of the method of the invention, the light source produces a light curtain.

The method of the invention can be used in particular when in addition to the spatial position of individual parts of the silhouette or of the diameter of an object the center of the cross-section of the object to be measured is also to be determined. It has been observed that this is particularly convenient with a method that uses two light beams having different beam directions.

According to a particular preferred embodiment, the light beams with different beam directions are produced with an assembly having at least one light source.

According to a particular preferred embodiment, a first light curtain is produced as a first light beam and a second light curtain is produced as a second light beam. According to a particularly preferred embodiment, the angle between the beam direction of the first light beam and the beam direction of the second light beam is different from 90° as well as from a multiple of 90°. Particularly preferred, the angle between the beam direction of the first light beam and the beam direction of the second light beam is between 15° and 45°, particularly preferred is 30°.

According to a particularly preferred embodiment of the method of the invention, the measuring instrument of the invention is moved along a longitudinal axis of the object to be measured, or the object to be measured is moved along its longitudinal axis past a measuring instrument according to the invention, whereby the geometric property of the object to be measured is determined, for example the course of parts of the silhouette or, for example, the course of the center of the cross-section of the object to be measured.

In a preferred embodiment, the method of the invention is performed without special pretreatment of the object to be measured, in particular without applying powder or a matte paint to a shiny object.

The measuring instrument according to the invention and the method of the invention can be used to measure geometric properties of a large number of objects. In a particularly preferred embodiment, the measuring instrument of the invention and the method of the invention can be used to determine the shape, in particular the diameter, the position of the center or the dimensions in one or several directions of a coordinate system, of an elongated body, in particular of a profile section or tube, or for determining the track of the centerline of an elongated body, in particular of a profile section or a tube. Particularly preferred applications relate to the measurement of the shape of a tube having a round, elliptical or rectangular cross-section or for determining the centerline of a tube having a round, elliptical or rectangular cross-section or for determining the shape of an I-beam. The object to be measured can hereby be fixedly installed in its surroundings, for example a tube installed in a room or a tube mounted in a holder for carrying out the measurement. The object to be measured can also be arranged on a measuring table.

According to a preferred embodiment of the method of the invention, the profile section to be measured is moved to the measurement region of the stationarily mounted measuring instrument.

BRIEF DESCRIPTION OF THE DRAWING

The invention will now be described in more detail with reference to several exemplary embodiments illustrated in the appended drawings. These show in FIG. 1 a schematic diagram of the measurement principle forming the basis of the exemplary embodiment of the invention, wherein an assembly is employed which produces at least two light beams with a different being directions.

DETAILED DESCRIPTION OF PREFERRED EMBODIMENTS

Figure 3:
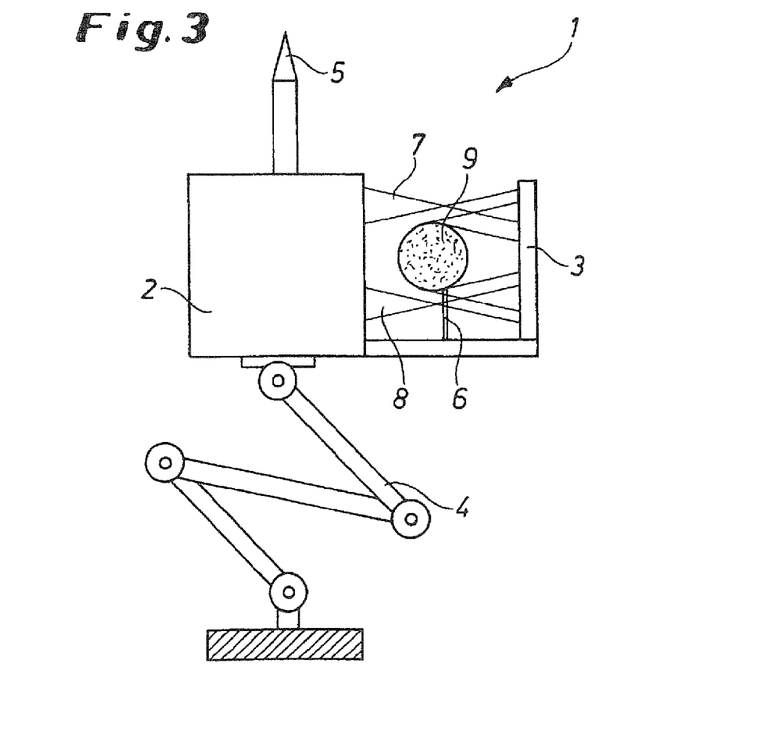
FIG. 3 a schematic side view of a measuring instrument according to the invention.

FIG. 3 shows a basic arrangement of a measuring instrument 1 according to the invention. The base body 2 includes all active components, such as the light source for the two light curtains, optics, recording device (here: camera) and electronics. The reflector 3 is a passive component and can therefore be constructed with a very narrow footprint. The instrument can be very light and easy to handle and can therefore be used as a handheld device. Typically, the instrument is disposed on a measuring arm 4 in a defined manner. The instrument can optionally be provided with a mountable sensor tip 5, in order to mechanically trace the spatial coordinates of an object 9 to be measured. FIG. 3 shows in form of an example the instrument with an optionally directed light beam 6 which substantially supports positioning of the instrument relative to the object 9 to be measured during the measurement process. Visible is a first light curtain 7 and a second light curtain 8 emerging from the base body 2. The light curtains 7, 8 partially propagate past the object 9 to be measured (here: a tube).

Figure 4A:
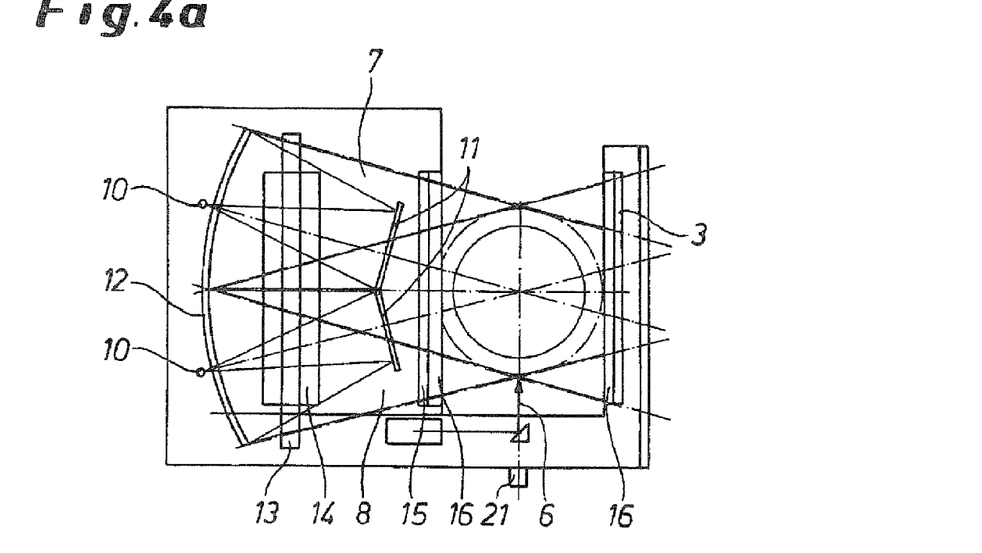
FIG. 4a a schematic side view in cross-section of a measuring instrument according to the invention.
Figure 4B:
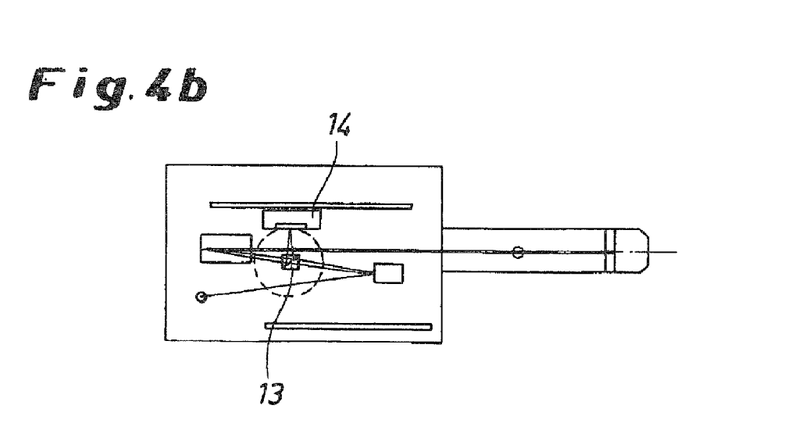
FIG. 4b a schematic top view in cross-section of a measuring instrument according to the invention.

FIGS. 4a and 4b illustrate a possible technical implementation of the instrument. Two point light sources 10, such as laser diodes, with suitable optics or LEDs are incident on a deviation mirror 11, a beam splitter prism 13 and in addition a common concave mirror 12, producing two parallel light curtains 7, 8. The light curtains are incident partly on the object 9 to be measured and partially on the reflector 3 (in this case, retro-reflecting tape). The light incident on the reflector 3 follows the same path back to the object 9 to be measured and is directed by the concave mirror 12 to the beam splitter prism 13. The beam splitter prism then directs the light beams to a common linear sensor 14. An optical high-pass filter 15 is mounted on the sensor side to prevent interfering ambient light from reaching the sensor 14. Parts of the optics of the instrument can be scratched. To protect the sensitive parts, materials such as quartz glass 16 or sapphire are advantageously employed.

The illustrated instrument in FIG. 4 is one example of the implementation. The dimensions need not correspond to those shown in FIG. 4. The arrangement in FIG. 4 is designed to minimize manufacturing costs: two inexpensive light sources 10 can be employed, as well as a common concave mirror 12, a common beam splitter prism 13 and a common line sensor 14.

Figure 5:
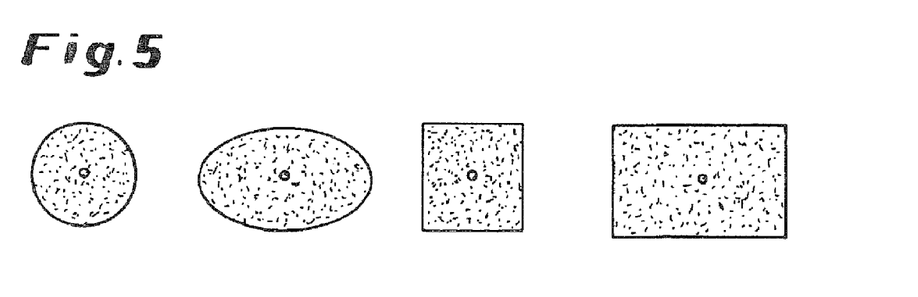
FIG. 5 a schematic diagram of an exemplary cross-sectional shapes whose shape and position can be measured with the measuring instrument according to the invention.

In the simplest embodiment, the object 9 to be measured is a circular tube or a rod. However, other cross-sectional shapes can also be measured. FIG. 5 illustrates from left to right different cross sections of the object 9 to be measured: circular, elliptical, square, rectangular. I-beams can also be measured.

Figure 6:
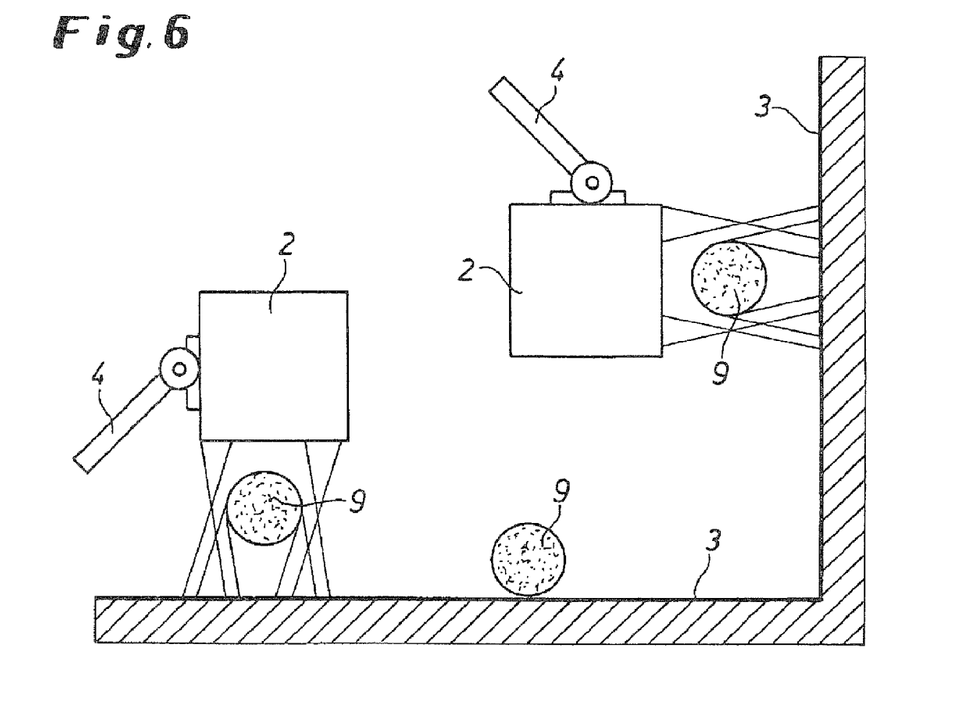
FIG. 6 a schematic diagram of an exemplary measurement situations.

The instrument can be provided with a removable reflector section. As illustrated in the example of FIG. 6, instead of the removed reflector section, a surface with retro-reflecting properties is arranged behind or below the object 9 to be measured, so that the reflected light again reaches the sensor head 2. The surface can, for example, be a work surface of a measurement bench and/or its rear wall, on which the object 9 to be measured is placed and/or against which it is leaning. The surface can also be a retro-reflecting foil which for performing the measurement is temporarily placed, for example, behind or below the object 9 to be measured.

As shown in FIG. 4a, the instrument can have an attachment 21 for the measuring arm.

The object 9 to be measured need not be positioned on or at this surface. A spacing between the object 9 to be measured and the surface is permitted (FIG. 6). The object 9 can reside during the measurement in the defined measurement region of the instrument. In this way, for example tubes bent in three dimensions and resting on the measurement bench can also be quickly and precisely measured.

Figure 7:
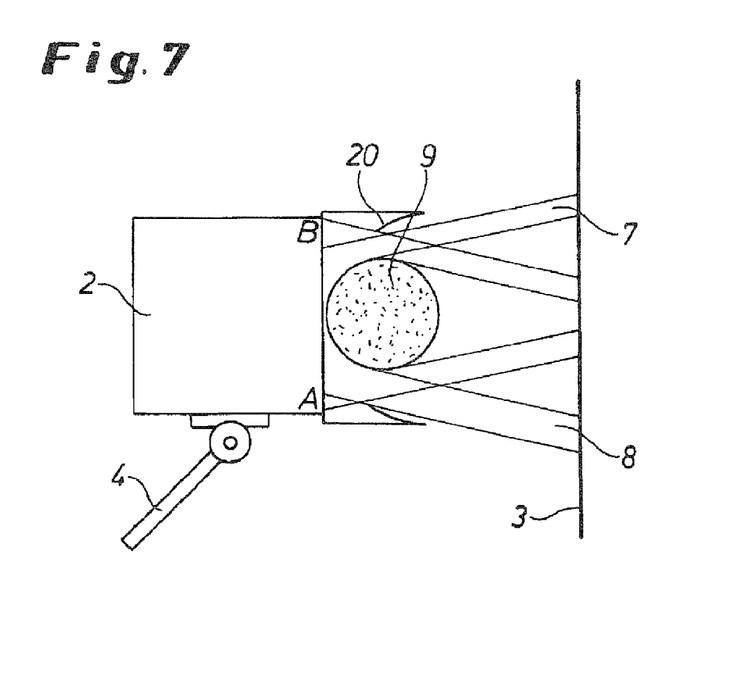
FIG. 7 another exemplary measurement situation with another embodiment of the measuring instrument according to the invention.

With this design, the instrument can also be used in small spaces. Other options for the instrument are illustrated in the examples depicted in FIG. 7. Advantageously, a guide aid 20 can be provided when the reflector section is removed. This guide aid 20 is mechanically constructed so that the object to be measured is always located inside the measurement region, i.e., in the region of the two light curtains 7, 8. In this case, the sensor head 2 must be pressed slightly against the object 9 to be measured. A removable reflector section can be attached, for example, to the sensor head 2 at A or at B.

With the instrument and the method described above, it has been assumed that the object 9 to be measured is located always inside the defined measurement region of the sensor head. This assumption limits the maximum cross-section of the object 9 to be measured.

Figure 8:
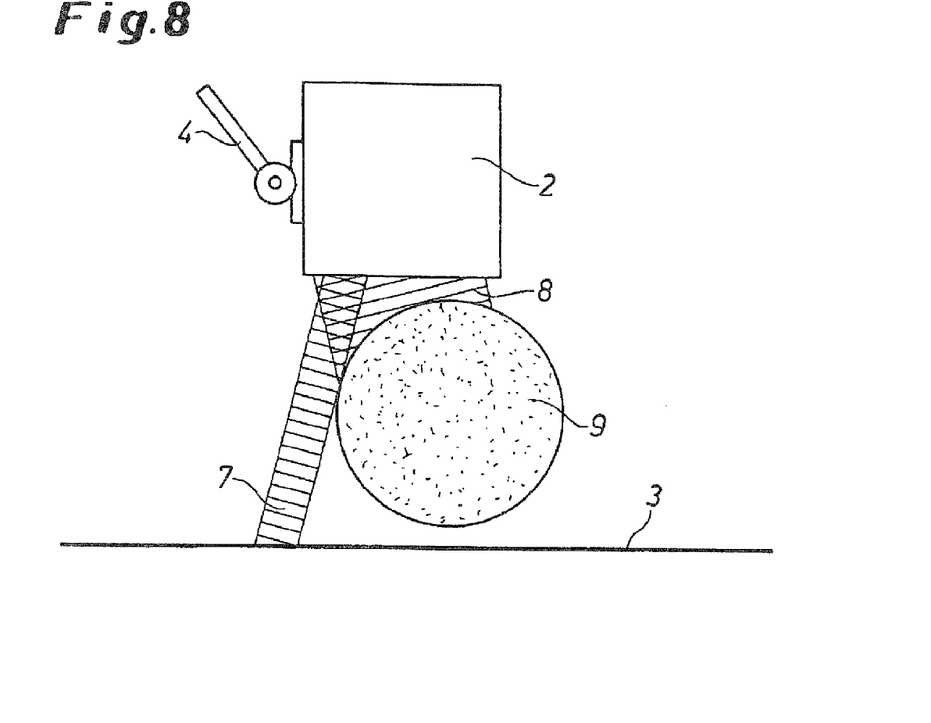
FIG. 8 another exemplary measurement situation.

The described instrument can also be used for measuring objects having large cross sections, which cannot be placed inside the region where the light beams 7, 8 intersect. The sensor head 2 without the reflector section is hereby placed in relation to the object 9 to be measured on the measuring arm 4, so that one of the two light curtains 7, 8 is partially shadowed (FIG. 8). The two light curtains 7, 8 are shown in FIG. 8 with hatching. The other light curtain 7, 8 can be either completely or partially shadowed. No tangent exists for a completely shadowed light curtain 7, 8: a retro-reflecting foil is always positioned behind the object 9 during the measurements. The sensor head 2 is located on the measuring arm 4, so that the position and orientation of the sensor head 2 in relation to the coordinate system of the measuring arm is always known. The position and orientation of each tangent is then also known in the coordinate system of the measuring arm. The cross-section of the object 9 is measured using one tangent or two tangents by suitable rotation of the sensor head 2 about the object 9. For example, the center, diameter or the shape of a cross-sectional areas of tubes or rods can be determined in this way. The position of the tube centerline and the surface topology of the object 9 are defined by moving the center (in addition to rotation) along the object 9 to be measured.

The surface topology and the spatial position of tubes or rods with variable cross-section and almost arbitrary course of the centerline can be measured with this method.

In FIGS. 9a to 9d show examples for measuring tubes having different cross sections. FIG. 9a describes the measurement process with an object 9 located inside the measurement region (as described above). The two partially shadowed light curtains 7, 8 are shown with hatching. A total of four tangents contacting the object 9 are available for the algorithm of the analysis.

FIGS. 9b and 9c illustrate the measurement of a tube with a cross-section greater than the measurement volume. Depending on the position of the tube in relation to the two light curtains 7, 8, either two tangents or only one tangent are available for the analysis.

Figure 9D:
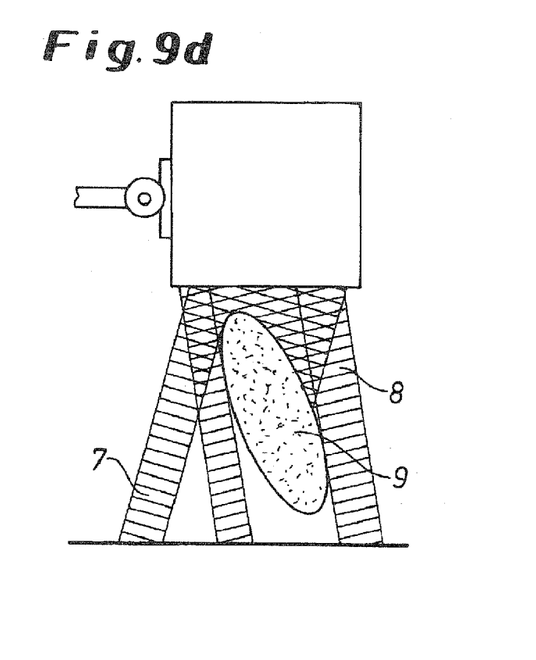

FIG. 9d shows an object 9 to be measured with an elliptic cross-section relative to the light curtains 7, 8, resulting in three tangents for this position.

The instrument is based on an optical, i.e., not a tactile principle: no direct mechanical contact between the object 9 to be measured and the instrument is required during the measurement process.

Figure 10:
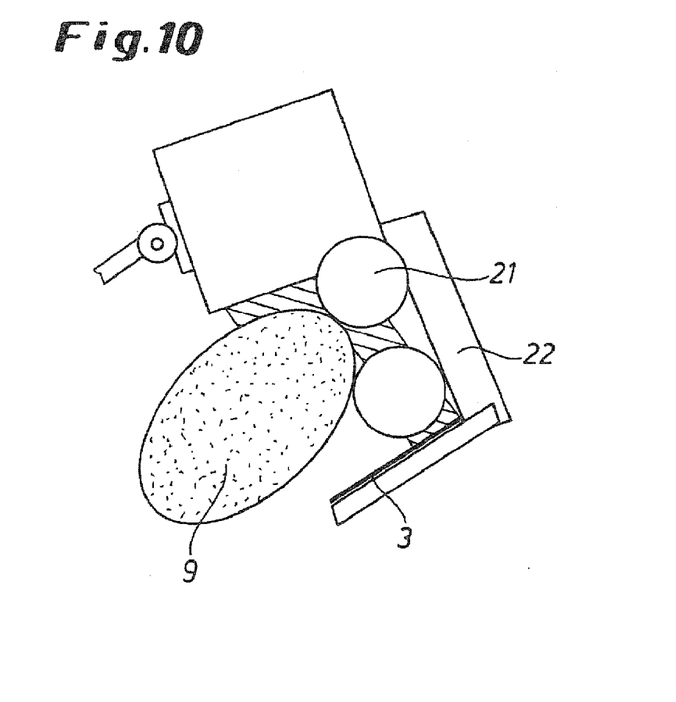
FIG. 10 another exemplary measurement situation with another embodiment of the measuring instrument according to the invention.

If the object 9 to be measured allows mechanical contact with the instrument, for example, by being fixedly mounted on a support, then an optional mechanical guide aid for the sensor head can be employed. One such example is illustrated in FIG. 10 for measuring the tube cross-section and the tube center. The object 9 to be measured is then always in an optimal measurement region. The guide aides are implemented, for example, as running wheels.

If the reflector section of the instrument is not used because, for example, large-diameter tubes are measured, then the retro-reflecting foil can be integrated in the mechanical guide aid.

Figure 11:
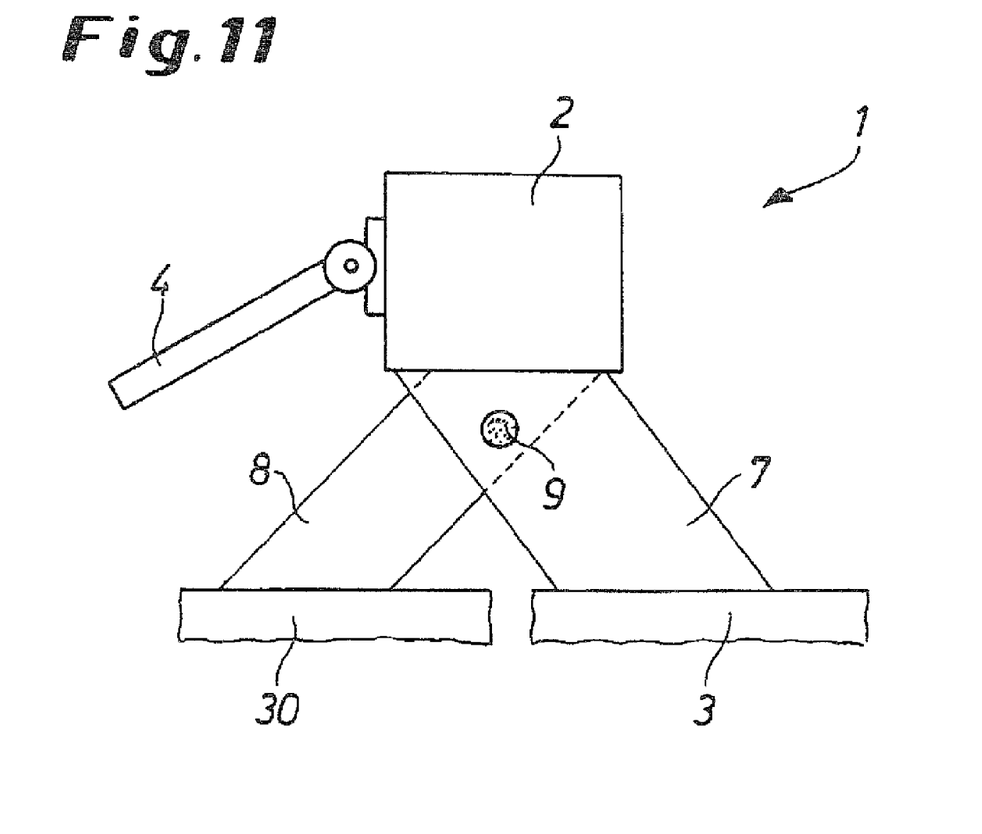
FIG. 11 a schematic side view of another embodiment of the measuring instrument according to the invention.

The embodiment of the measuring instrument of the invention illustrated in FIG. 11 shows a measuring instrument 1 with a base body 2, using identical reference numerals for identical components. This base body 2 includes the active components for producing the two light curtains 7, 8, i.e., for example the light source and optical elements. The base body 2 also includes a recording device for the light of the light curtain 7 that is reflected by the retro-reflecting reflector 3.

Unlike in the other embodiments described above, the light curtain 8 is not to reflected by a retro-reflecting surface associated with the light curtain. The light intensity distribution of the light curtain 8 is measured along its transverse dimension with a separate element 30 of the recording device.

What is claimed is:

1. A measuring instrument for determining at least one geometric property of a profile section, comprising
    an assembly which produces at least one first collimated light beam and one second collimated light beam, wherein a beam direction of the first collimated light beam is different from a beam direction of the second collimated light beam,
    a retro-reflecting surface, which is arranged with respect to a light source of the assembly so that at least the first collimated light beam is incident at least partially on the retro-reflecting surface, and
    a recording device which determines a light intensity distribution in a transverse dimension of at least a portion of a first reflected light beam produced when the first collimated light beam is reflected by the retro-reflecting surface, said recording device also determining a light intensity distribution in the transverse dimension of at least a portion of the second light beam or of at least a portion of a second reflected light beam produced when the second collimated light beam is reflected by the retro-reflecting surface or by another retro-reflecting surface.

2. The measuring instrument according to claim 1, wherein an angle between the beam direction of the first light beam and the beam direction of the second light beam is different from 90° and also from a multiple of 90°.

3. The measuring instrument according to claim 1, wherein the assembly, which produces the at least two light beams with different beam direction, comprises at least two light sources.

4. A measuring instrument for determining at least one geometric property of a profile section, comprising
    an assembly which produces at least one first and one second light beam, wherein a beam direction of the first light beam is different from a beam direction of the second light beam,
    a retro-reflecting surface, which is arranged with respect to a light source of the assembly so that at least the first light beam is incident at least partially on the retro-reflecting surface, and
    a recording device which determines a light intensity distribution in a transverse dimension of at least a portion of a first reflected light beam produced when the first light beam is reflected by the retro-reflecting surface, said recording device also determining a light intensity distribution in the transverse dimension of at least a portion of the second light beam or of at least a portion of a second reflected light beam produced when the second light beam is reflected by the retro-reflecting surface or by another retro-reflecting surface,
    wherein the light assembly produces the at least one first and one second divergent light beam, the measuring instrument further comprising a concave mirror on which the divergent light beams are incident in such a way that the light beams reflected by the concave mirror are light beams with parallel light.

5. The measuring instrument according to claim 4, wherein the assembly comprises two light sources producing two corresponding divergent light beams, with the two divergent light beams directed by a common deviating mirror or by two separate deviating mirrors onto a common concave mirror, with the divergent light beams reflected by the concave mirror forming the first light beam and the second light beam.

6. The measuring instrument according to claim 1, wherein the retro-reflecting surface is formed on a reflector element that is releasably connected with a base body, wherein the base body comprises the assembly that produces the first and the second light beam.

7. The measuring instrument according to claim 1, further comprising a measuring arm that is connected with the assembly that produces the first and the second light beam.

8. The measuring instrument according to claim 1, further comprising a sensing device configured to sense a surface or a point of the object whose dimensions are to be measured.

9. A method for determining a geometric property of an object, comprising the steps of:
    producing with an assembly a first collimated light beam and a second collimated light beam having different beam directions,
    holding the object to be measured between the assembly and a retro-reflecting surface in such a way that the first collimated light beam is incident partially on the retro-reflecting surface and partially on the object to be measured,
    measuring with a recording device at a first location a light intensity distribution in a transverse dimension of at least a portion of a first reflected light beam produced when the first collimated light beam is reflected by the retro-reflecting surface, and measuring with the recording device at a second location a light intensity distribution in the transverse dimension of the second light beam or of at least a portion of a second reflected light beam produced when the second collimated light beam is reflected by the retro-reflecting surface, and
    determining from the light intensity distribution measured at the first and second location the geometric property of the object.

10. The method according to claim 9, wherein the assembly produces at least two light beams having different beam directions with at least one light source.

11. The method according to claim 9, wherein the first and second light beams are formed as a first and a second light curtain.

12. The method according to claim 9, wherein an angle between the beam direction of the first light beam and the beam direction of the second light beam is different from 90° and also from a multiple of 90°.

13. The method according to claim 9, wherein the geometric property of the object is determined by moving a measuring instrument comprising the assembly, the retro-reflecting surface and the recording device along a longitudinal axis of the object or by moving the object along the longitudinal axis past the measuring instrument.

14. The method according to claim 9, wherein the object is an elongated body and the geometric property of the object comprises a diameter of the object, a location of a center of the object, a course of a center line of the object, or dimensions of the object in one or more directions of a coordinate system.

15. The method according to claim 14, wherein the elongated body comprises a profile section or a tube.

16. The method according to claim 15, wherein the object is fixedly installed in relation to surroundings.

17. The method according to claim 9, wherein the object is arranged on a measurement table.

18. The method according to claim 15, wherein the profile section or tube has a transverse dimension greater than a transverse dimensions of the first and second light beams.

* * * * *